United States Patent [19]

Imamura et al.

[11] 4,200,605
[45] Apr. 29, 1980

[54] PRODUCTION OF REINFORCED PLASTIC PIPES

[75] Inventors: Tetuo Imamura, Kusatsu; Minoru Yasuhara, Ohtsu; Masaru Teramae, Shiga, all of Japan

[73] Assignee: Sekisui Kagaku Kogyo Kabushiki Kaisha, Osaka, Japan

[21] Appl. No.: 828,845

[22] Filed: Aug. 29, 1977

[30] Foreign Application Priority Data

Sep. 1, 1976 [JP] Japan .................................. 51-105239

[51] Int. Cl.² .......................... B28B 11/08; B28B 11/14
[52] U.S. Cl. ..................................... 264/145; 264/159; 264/167; 264/296
[58] Field of Search ................ 264/145, 149, 167, 296, 264/159

[56] References Cited

U.S. PATENT DOCUMENTS

| | | | |
|---|---|---|---|
| 3,406,231 | 10/1968 | Ullman et al. | 264/145 |
| 3,538,207 | 11/1970 | Hegler | 264/145 |
| 3,623,930 | 11/1971 | Grosh | 156/250 |
| 3,784,667 | 1/1974 | Drostholm et al. | 264/167 |
| 3,962,766 | 6/1976 | Pompidor et al. | 264/296 |

FOREIGN PATENT DOCUMENTS 49-1944  2/1974  Japan .

*Primary Examiner*—James H. Derrington
*Attorney, Agent, or Firm*—Wenderoth, Lind & Ponack

[57] ABSTRACT

A method for continuously producing a reinforced plastic pipe includes helically winding an endless belt on a rotating mandrel, continuously winding a molding material impregnated with a thermosetting resin on the endless belt, continuously moving the molding material toward the tip of the mandrel together with the endless belt by the rotation of the mandrel, passing the moving molding material through a curing zone to cure the thermosetting resin, and then removing the molding material from the endless belt at the tip portion of the mandrel. Prior to the introduction of the molding material into the curing zone, a split ring mold having an inside surface of a desired shape is mounted around the molding material so as to clamp the molding material tightly, thereby to convert the shape of the outside surface of the molding material into one corresponding to the shape of the inside surface of the split ring mold. After the molding material leaves the curing zone, the split ring mold is removed from the molding material, and that portion of the molding material on which the mold had been mounted is severed to provide a reinforced plastic pipe having a spigot element of a desired outside diameter and a desired outside surface shape.

3 Claims, 9 Drawing Figures

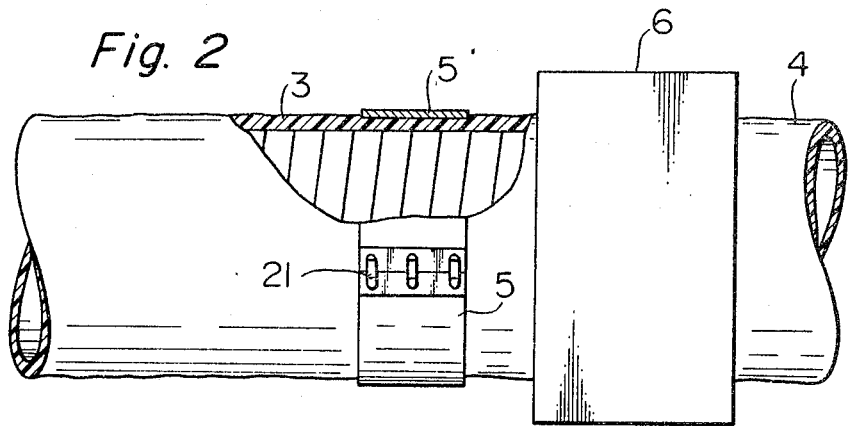
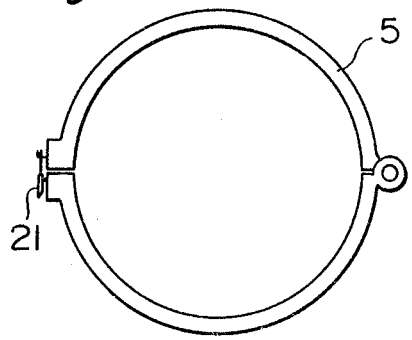
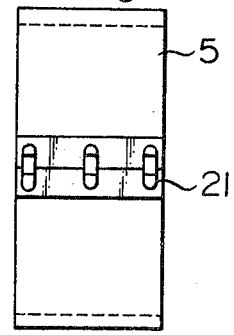
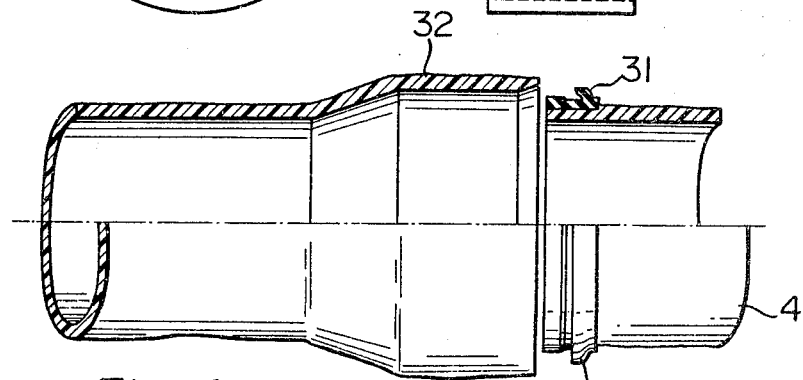

PRODUCTION OF REINFORCED PLASTIC PIPES

FIELD OF THE INVENTION

This invention relates to a method for continuously producing a reinforced plastic pipe having a spigot fitting of a desired outside diameter and outside surface shape.

BACKGROUND OF THE INVENTION

It is already known to continuously produce pipes from reinforced plastics consisting of thermosetting resins such as unsaturated polyester resins reinforced with glass fibers. For example, U.S. Pat. No. 3,464,879 discloses a process for continuously producing a reinforced plastic pipe which comprises winding glass fibers impregnated with an unsaturated polyester resin around an endless belt which is helically wound on a rotating mandrel and which moves in the axial direction of the mandrel while rotating together with the mandrel, and passing the resin-impregnated glass fibers moving together with the endless belt through a curing zone, to thereby cure the unsaturated polyester resin. The reinforced plastic pipe so produced is removed from the endless belt after curing, and severed to predetermined lengths by a suitable cutter. The pipes obtained are used, for example, as water supply pipes, drainage pipes, or crude oil transporting pipes. In using a reinforced plastic pipe in these applications, a pipe connecting method is employed which comprises shaping one end of a pipe as a bell end and the other end as a spigot end, fitting the spigot end of one pipe into the bell end of another pipe, and sealing the space between them water-tight by a push-on type or O-ring type sealing gasket.

Various methods have been suggested for forming a bell element at one end of a pipe, and the methods disclosed in U.S. Pat. No. 3,784,667 and Japanese Pat. Publication No. 5024/76 are among them.

When a reinforced plastic pipe is produced by the continuous manufacturing method described hereinabove, the surface smoothness of the pipe is markedly impeded, and considerable unevenness occurs on its outside surface. If, therefore, one end of the resulting pipe is used directly as a spigot end and fitted into a bell end formed by the known method mentioned above, the adhesion between the spigot portion and the sealing gasket will become poor because of the unevenness of the outside surface of the spigot portion. This presents two problems. Firstly, the sealing gasket tends to be removed during the operation of fitting the spigot portion into the bell portion. Secondly, even when the sealing gasket is not removed, water leakage occurs at the uneven part of the spigot element.

One of the methods widely practiced heretofore to avoid these problems involves smoothing one end of a pipe to be used as a spigot by polishing. Generally, the polishing step in this method is performed batchwise, and therefore, causes the disadvantage that pipe production cannot be performed continuously. Furthermore, such method has the disadvantage that the polishing step is complicated and time-consuming and thus reduces productivity, and the polishing operation causes the scattering of dust which is likely to affect the health of the working personnel. Such method also suffers from a more serious defect in that the strength of the pipe is reduced because the polishing causes the thinning of the glass fiber-reinforced plastic layer at the outside surface of the spigot element. In the production of reinforced plastic pipes, the dual desire of maximizing the strength and rigidity of the pipes on one hand and of minimizing the cost of production on the other led, in many cases, to the employment of a sandwich-structure method wherein the outside surface layer and inside surface layer of a pipe which contribute mainly to strength are formed of an unsaturated polyester reinforced with a roving of glass fibers, and the intermediate layer which contributes mainly to rigidity is formed of an unsaturated polyester reinforced with silica sand which is available at low cost or a mixture of silica sand and a chopped strand of glass fibers. The thickness of these layers vary depending upon the diameter of the pipe and its required strength. Usually, the thickness of each of the outside surface layer and the inside surface layer is about 1 to 3 mm, and the thickness of the interlayer is about 10 to 20 mm. Shaving of the outside surface layer by a thickness of, say, 0.5 to 1 mm, by polishing therefore causes a serious reduction in its strength.

Japanese Pat. Publication No. 1944/74 discloses a method of polishing a reinforced plastic pipe continuously. According to this method, a reinforced plastic pipe whose curing has been completed in a first curing zone is moved to a polishing zone where the outside surface of the pipe is polished continuously. A solution of an unsaturated polyester resin is then sprayed onto the polished outside surface. The pipe is then passed through a second curing zone to cure the resin solution. This method requires two curing zones and has the defect of increased costs and space for the installation of equipment. Furthermore, a boundary surface occurs between the reinforced plastic layer cured first and the unsaturated polyester layer applied and cured later, and the mechanical strength of the pipe is insufficient.

U.S. Pat. No. 3,623,930 discloses a method for forming a spigot portion containing an O-ring slot at one end of a pipe by clamping a split ring mold configured to form a slot around the pipe, filling an uncured polyester resin into a space between the split ring mold and the pipe, and then curing it. This method, however, has the defect that the manufacturing steps are complicated, and the operation must be performed batchwise.

It is an object of this invention to provide a method which eliminates the defects of the prior methods for forming a spigot element in a reinforced plastic pipe, and which can continuously produce a reinforced plastic pipe having a spigot element with high strength and a desired outside diameter and a desired outside surface shape.

SUMMARY OF THE INVENTION

The present invention provides a method for continuously producing a reinforced plastic pipe by helically winding an endless belt on a rotating mandrel, continuously winding a molding material impregnated with a thermosetting resin on the endless belt, continuously moving the molding material toward the tip of the mandrel together with the endless belt by the rotation of the mandrel, passing the moving molding material through a curing zone to cure the thermosetting resin, and then removing the molding material from the endless belt at the tip portion of the mandrel. Prior to the introduction of the molding material into the curing zone, a split ring mold having an inside surface of a desired shape is mounted around the molding material so as to clamp the molding material tightly, to thereby convert the shape of the outside surface of the molding material into one corresponding to the shape of the inside surface of the split ring mold, and after the molding material leaves the curing zone, the split ring mold is removed from the molding material, and that portion of the molding material on which the mold has been mounted is severed to provide a reinforced plastic pipe having a spigot element of a desired outside diameter and a desired outside surface shape.

BRIEF DESCRIPTION OF THE DRAWINGS

FIG. 2 is a partial view of the apparatus of FIG. 1 which shows only the formation of a spigot portion having a smooth surface by means of a split ring mold;

FIGS. 3(a) and 3(b) are a side elevation and a front elevation, respectively, of the split ring mold used in FIG. 2;

FIG. 4 is a partial sectional view showing the connection of the spigot portion produced by the split ring mold of FIG. 2 to a bell portion;

DETAILED DESCRIPTION OF THE INVENTION

The invention is described below with reference to the accompanying drawings.

Figure 1:
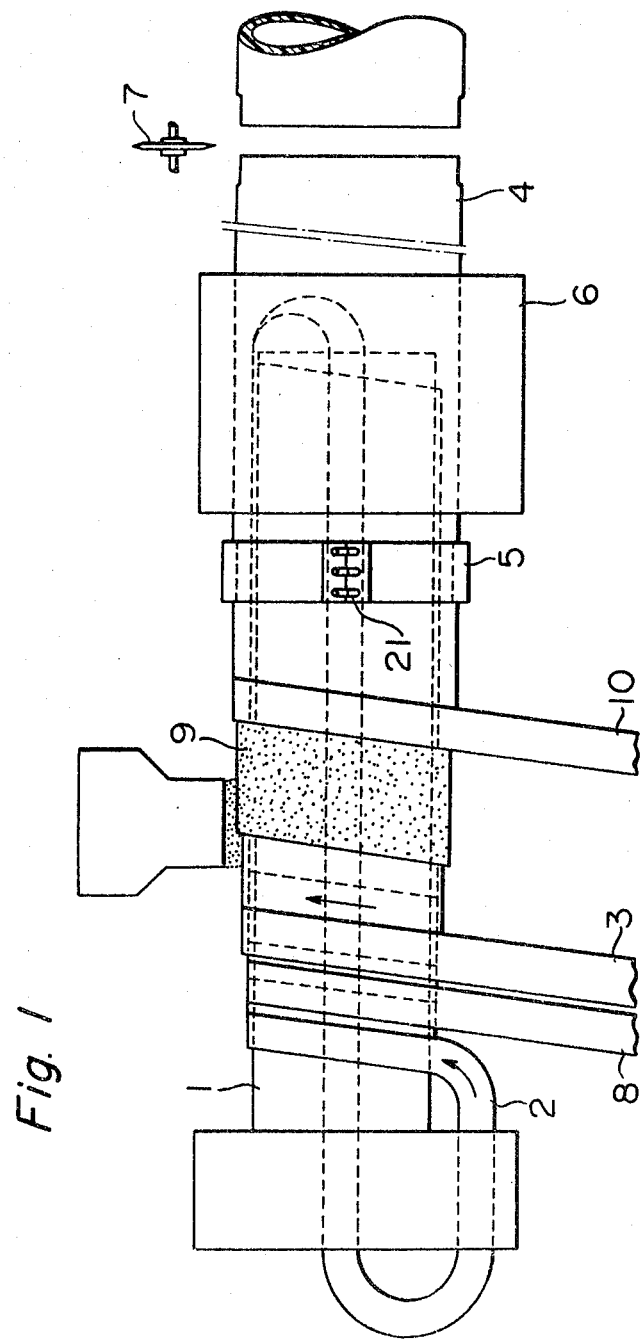
FIG. 1 is a schematic view showing an apparatus for performing one embodiment of the method of this invention.

In FIG. 1, the reference numeral 1 represents a rotating mandrel having a hollow core. An endless belt 2 preferably made of steel is wound continuously and helically on the mandrel with a pitch corresponding to the belt width. The endless belt 2 is moved continuously toward the tip of the mandrel by the rotation of the mandrel, and returns from the tip of the mandrel through its hollow core to the point where the winding starts. By one rotation of the mandrel, the endless belt moves by one pitch toward the tip of the mandrel. The speed of this movement in the axial direction of the mandrel is very slow, and is usually about 5 to 20 meters per hour. When a molding material 3 impregnated with a thermosetting resin is continuously wound on the endless belt, the molding material moves toward the tip of the mandrel at the same speed as the moving speed of the endless belt 2 and enters a curing zone 6 heated at a predetermined temperature by a suitable heater such as an infrared heater. During passage through the curing zone, the thermosetting resin is cured, and the molding material 3 impregnated with the thermosetting resin is shaped into a reinforced plastic pipe 4. The thermosetting resin used in this invention is an unsaturated polyester resin or an epoxy resin, the unsaturated polyester resin being preferred. On the other hand, a roving of glass fibers is preferred as the molding material used in this invention.

Figure 5:
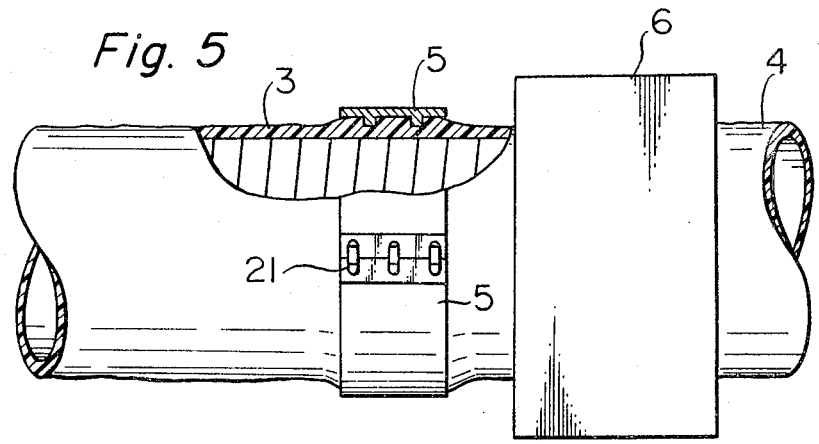
FIG. 5 is a partial view of the apparatus of FIG. 1 which shows only the formation of a spigot portion having an O-ring slot by means of a split ring mold.
Figure 6A:
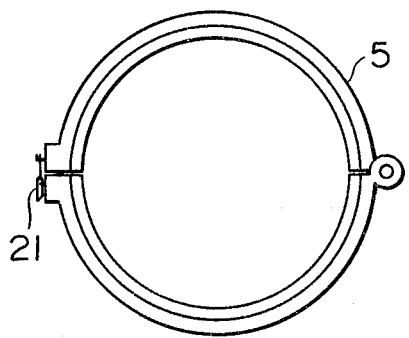
FIGS. 6(a) and 6(b) are a side elevation and a front elevation, respectively, of the split ring mold used in FIG. 5.
Figure 6B:
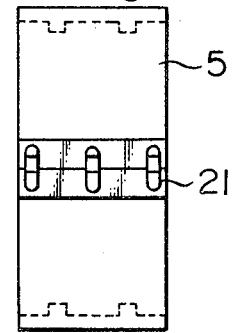

In the method of this invention, as shown in FIG. 2 or 5, a split ring mold 5 is mounted around the molding material 3 impregnated with a thermosetting material and wound up on the endless belt 2 before the molding material enters the curing zone 6. The mounting is effected such that the molding material is tightly clamped by the split ring mold 5. The split ring mold 5 is made of a thermally stable, light-weight, tough material such as aluminum, iron or a thermally stable synthetic resin. The inside surface of the split ring mold 5 has such a shape, as will impart a desired outside diameter and a desired outside surface shape to the resulting spigot, for example a cylindrical shape having a smooth surface as shown in FIGS. 3(a) and 3(b) or a shape suitable for stamping an O-ring slot on the outside surface of the molding material as shown in FIGS. 6(a) and 6(b). Since the thermosetting resin impregnated in the molding material is still in the uncured state before entry into the curing zone, the molding material 3 is easily deformed by an external force, and thus the outside surface of the molding material takes a shape corresponding to the shape of the inside surface of the split ring mold 5. As a result of the passage of the molding material through the curing zone 6 while the split ring mold 5 is mounted thereon, the outside surface of that portion (i.e., spigot portion) of the resulting reinforced plastic pipe 4 on which the split ring mold 5 has been mounted assumes a shape corresponding to the inside surface of the split ring mold 5, for example a smooth cylindrical surface as shown in FIG. 2, and a surface having an O-ring slot as shown in FIG. 5. After leaving the curing zone 6, the reinforced plastic pipe 4 is detached from the endless belt 2 at the tip portion of the mandrel, and at this point, the endless belt returns through the hollow core of the mandrel to the point where the winding starts. The reinforced plastic pipe 4 is guided by a suitable support member (not shown), and continues to advance. At a suitable point after the reinforced plastic pipe 4 leaves the curing zone, the mounted split ring mold 5 is detached from the reinforced plastic pipe 4, and the reinforced plastic pipe 4 is severed by a cutter 7 at approximately the longitudinal center of the portion where the mold had been mounted. This provides two spigot ends at the reinforced plastic pipe 4, and the outside surface shape of each spigot end corresponds to the shape of the inside surface of the split ring mold 5.

To facilitate the separation of the reinforced plastic pipe from the endless belt in the performance of the method of this invention, it is preferred to interpose a mold releasing tape such as a Cellophane tape or a polyethylene terephthalate tape between the endless belt 2 and the resin-impregnated molding material 3. This can be achieved by winding a mold releasing tape 8 around the endless belt 2 at a point before that at which the winding of the molding material 3 starts, as shown in FIG. 1.

Since the moving speed of the resin-impregnated molding material in the axial direction of the mandrel is very slow, mounting of the split ring mold 5 on the molding material and the detaching of the mold 5 from the reinforced plastic pipe can be performed very easily even during the continuous operation of the method. For example, the split ring mold 5 can be simply mounted or dismounted by closing or opening a stopper 21 of the mold, as shown in the drawings. This can be achieved either by a manual operation or by a mechanical automatic operation. In order to facilitate the detachment of the mold 5 from the reinforced plastic pipe, it is generally preferred to use a split ring mold 5 whose inside surface is coated with a suitable mold releasing agent such as a silicone-type releasing agent.

Figure 7:
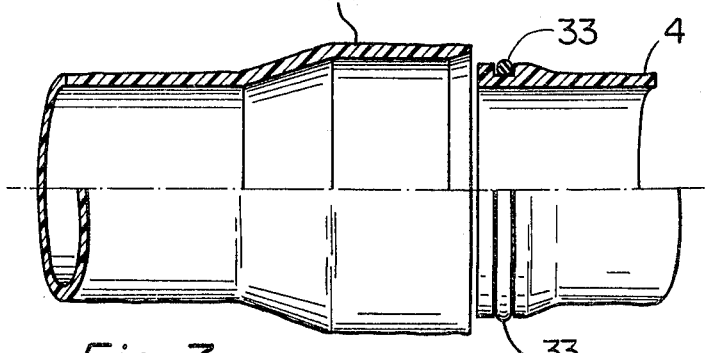
FIG. 7 is a partial sectional view showing the connection of the spigot portion formed by the split ring mold in FIG. 6 to a bell portion.

A sealing gasket 31 of the push-on type shown in FIG. 4 is bonded to the spigot portion having a smooth cylindrical surface produced by the method shown in FIG. 2, and the spigot portion is connected to a bell element 32 of another pipe. The spigot portion having an O-ring slot produced by the method shown in FIG. 5, after bonding an O-ring type sealing gasket 33 thereto, is connected to a bell portion 34 of another pipe as shown in FIG. 7.

If a spigot portion having an O-ring slot is to be formed by the method of this invention, it is preferred to render the thickness of the spigot portion of the molding material larger than that of the remainder of the molding material by supplying an excess of the resin-impregnated molding material.

The method of this invention makes it possible to produce reinforced plastic pipes having spigot portions of desired outside diameters and desired outside surface shapes continuously by a very simple operation, and does not require any after-processing step for the formation of spigot portions. The spigot portions so obtained have excellent performance without a reduction in mechanical strength and without water leakage that is normally caused by the unevenness of the spigot portions.

While the method for continuously producing spigot elements of reinforced plastic pipes has been described hereinabove with reference to specific embodiments, it is to be understood tha various changes and modifications are possible in the performance of the method of this invention. For example, it is possible to produce a reinforced plastic pipe having spigot elements at both ends thereof by the method of this invention, and to connect each spigot portion to a bell portion of another pipe. In many cases, however, it is preferred to produce a reinforced plastic pipe having a spigot portion at one end and a bell portion at the other end. In this case, the spigot portion is produced by the method of this invention, and the bell portion is formed by any known technique of forming bell portions continuously. A reinforced plastic pipe having a spigot end and a bell end can be continuously produced by combining the method of this invention with the method of forming bell portions.

Since the method of this invention relates to the formation of spigot elements, and not to the formation of bell elements, any detailed description of the formation of bell portions is omitted herein. A bell portion is provided at a position just intermediate between two adjacent spigot portions, and thus, the bell portions and the spigot portions are formed alternately. The bell portion is severed at about its center by the cutter 7 as in the case of the spigot portion.

In the method of this invention, only one kind of a molding material impregnated with a thermosetting resin may be used to produce the reinforced plastic pipe. If desired, a reinforced plastic pipe of a sandwich structure may be produced by using two kinds of thermosetting impregnated molding materials in accordance with a known method. In this embodiment, it is preferred to form the outside surface layer and the inside surface layer of the sandwich structure from a roving of glass fibers impregnated with a thermosetting resin and to form the intermediate layer from silica sand alone or a mixture thereof with a chopped strand of glass, which is impregnated with a thermosetting resin. In FIG. 1, the reference numeral 9 shows silica sand impregnated with a thermosetting resin which is fed from a hopper for the formation of the intermediate layer in this embodiment, and the reference numeral 10 shows the winding of a thermosetting resin-impregnated molding material for forming the outside surface layer. The thermosetting resin-impregnated molding material shown at 3 in FIG. 1 forms the inside surface layer of the sandwich structure.

What is claimed is:

1. A method for continuously producing a reinforced plastic pipe having a spigot end, said method comprising:
   continuously helically winding an endless belt on an elongated rotating mandrel;
   continuously helically winding molding material impregnated with a thermosetting resin on said endless belt, thereby forming a pipe structure of wound molding material;
   continuously rotating said mandrel, and thereby continuously moving said endless belt and said pipe structure of wound molding material longitudinally of said mandrel toward an end thereof;
   providing a split ring mold having an inner surface configuration corresponding to the desired outer surface configuration of a spigot end to be formed;
   clamping said split ring mold around an axial length portion of said continuously longitudinally moving pipe structure of wound molding material, and pressing the inner surface of said split ring mold into said wound molding material, thereby forming the outer surface of said axial length portion of said pipe structure of wound molding material into said desired outer surface spigot end configuration;
   thereafter continuously longitudinally moving said split ring mold with said longitudinally moving pipe structure of wound molding material, and passing said pipe structure and said split ring mold through a curing zone, thereby curing said thermosetting resin and forming a cured pipe structure;
   after said cured pipe structure and said split ring mold are discharged from said curing zone, removing said split ring mold; and
   thereafter severing said cured pipe structure at said axial length portion, to thereby provide a length of reinforced plastic pipe having a finished spigot end of said desired outer surface configuration and a desired outer diameter.

2. A method as claimed in claim 1, wherein said split ring mold is provided with a smooth cylindrical inner surface, and said step of pressing forms a smooth cylindrical said outer surface of said axial length portion of said pipe structure of wound molding material.

3. A method as claimed in claim 1, wherein said split ring mold is provided with an inner surface including an inwardly extending annular rib, and said step of pressing forces said annular rib into said wound molding material, thereby forming an annular recess, capable of receiving an O-ring, in said outer surface of said axial length portion of said pipe structure of wound molding material.

* * * * *